United States Patent [19]  
Abolins et al.

[11] Patent Number: 4,535,106  
[45] Date of Patent: Aug. 13, 1985

[54] THERMOPLASTIC COMPOSITIONS OF POLYPHENYLENE ETHER RESIN AND PRE-COMPOUNDED BLEND OF ORGANOPOLYSILOXANE AND POLY(ARYLOLEFIN-OLEFIN)

[75] Inventors: Visvaldis Abolins, Delmar; Fred F. Holub, Schenectady, both of N.Y.

[73] Assignee: General Electric Company, Pittsfield, Mass.

[21] Appl. No.: 658,282

[22] Filed: Oct. 5, 1984

[51] Int. Cl.³ .............................................. C08K 5/51
[52] U.S. Cl. ............................. 524/151; 524/143; 524/150; 524/264; 524/265; 524/267; 524/343; 524/372; 524/397; 524/445; 525/92; 525/96; 525/106
[58] Field of Search ............... 524/143, 150, 151, 264, 524/265, 267, 343, 372, 397, 445; 525/92, 96, 106

[56] References Cited  
U.S. PATENT DOCUMENTS

| | | | |
|---|---|---|---|
| 3,361,851 | 1/1968 | Gowan | 525/106 |
| 3,960,985 | 6/1976 | Cooper | 525/106 |
| 4,139,574 | 2/1979 | Cooper et al. | 525/92 |
| 4,322,507 | 3/1980 | Haaf | 525/92 |
| 4,446,090 | 5/1984 | Loogren et al. | 525/106 |

Primary Examiner—Jacob Ziegler  
Attorney, Agent, or Firm—Hedman, Gibson, Costigan & Hoare

[57] ABSTRACT

Thermoplastic compositions of a polyphenylene ether resin and a precompounded blend of a poly(arylolefin-olefin), an organopolysiloxane and a linking agent are described. The precompounding of the organopolysiloxane with a poly(arylolefin-olefin) enables the compatible incorporation of larger amounts of organopolysiloxane than otherwise possible, and the resulting novel composition provides various desirable properties.

27 Claims, No Drawings

THERMOPLASTIC COMPOSITIONS OF POLYPHENYLENE ETHER RESIN AND PRE-COMPOUNDED BLEND OF ORGANOPOLYSILOXANE AND POLY(ARYLOLEFIN-OLEFIN)

BACKGROUND OF THE INVENTION

The polyphenylene ether resins are an art-recognized class of engineering thermoplastics which are extrudable and moldable into articles of various shapes and sizes. Such polymers and methods for their preparation are described in the patent literature, including U.S. Pat. Nos. 3,306,874 and 3,306,875 (Hay), U.S. Pat. Nos. 3,257,357 and 3,257,358 (Stamatoff), and elsewhere.

Cizek in U.S. Pat. No. 3,383,435 discloses thermoplastic compositions of polyphenylene ether resin and styrene resin, including rubber modified styrene resin. The compositions can be shaped into articles having better properties than the polyphenylene ether resin alone.

Cooper in U.S. Pat. No. 3,960,985 describes thermoplastic compositions of a polyphenylene ether resin, an alkenyl aromatic resin and an organopolysiloxane. The compositions are described as having good thermal stability, resisting discoloration when processed at elevated temperatures.

Gowan in U.S. Pat. No. 3,361,851 discloses blends of a polyolefin and a polyphenylene oxide. As taught in the patent, the presence of the polyolefin improves the notched Izod impact strength and resistance to cracking upon exposure to aggressive solvents, while also acting as a plasticizer for the polyphenylene oxide.

Experience has shown that polyphenylene ether(oxide) resins are not readily compatible with all other polymers, and that, in fact, these resins will tolerate only relatively small amounts of some other polymers, such organopolysiloxanes or polyolefins, without detriment to physical properties. Thus, for instance, Gowan teaches in column 3, on lines 36-39 that up to about 10 percent by weight of a polyolefin can be incorporated into a polyphenylene oxide before incompatibility is noticed. Above 10 percent, the molded parts tend to delaminate and the composition begins to weaken.

Similarly, in practice it has been found that diorganopolysiloxanes are not fully compatible with polyphenylene oxide resins over the full range of relative amounts. Lovgren, et al. in U.S. Pat. No. 4,446,0190 disclose a procedure for blending a thermoplastic polymer, for example, a polyolefin or a polyphenylene ether, with a silicone fluid on a continuous basis. The thermoplastic is melted in an extruder, a high viscosity silicone fluid is injected directly into the melt, and the two are thereafter processed together through the remaining portion of the extruder.

Lovgren, et al. disclose in column 6, beginning on line 6, that these compositions can also include additives, for example, cross linking agents, among others, and that either the thermoplastic polymer or the silicone fluid may be preblended with the additive before the thermoplastic and silicone are mixed together in the extruder.

SUMMARY OF THE INVENTION

Briefly described, this invention comprises thermoplastic blends of (a) a polyphenylene ether resin and a pre-compounded composition of (b)(i) a poly(arylolefin-olefin), (b)(ii) an organopolysiloxane and (b)(iii) an effective amount of a linking agent.

The invention is based on the new discovery that the organopolysiloxane is more readily combinable with the polyphenylene ether resin to give easier flow during molding and good impact resistance after molding if it is first compounded with a poly(arylolefin-olefin) and a linking agent, e.g., organic peroxide, prior to admixing with the polyphenylene ether. The resulting precompounded composition, component (b), is thermoplastic and will soften and melt together with the polyphenylene either resin when the composition is processed at elevated temperatures into the finished article.

DETAILED DESCRIPTION OF THE INVENTION

Preferred for use as component(a) of the compositions of this invention are polyphenylene ether homopolymers or copolymers having units of the formula

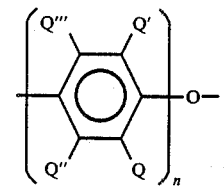

in which Q, Q', Q" and Q''' are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20, and more usually at least 50.

In general, these polymers are self-condensation products of monohydric, monocyclic phenols produced by reacting phenols with oxygen in the presence of complex metal catalysts, with the molecular weight being controlled by the reaction time, longer times providing a higher average number of repeating units. Suitable procedures are disclosed in greater detail in the patent literature, including the above mentioned Hay and Stamatoff patents, which are incorporated herein by reference.

Phenolic monomers from which the polyphenylene ether resins can be made include, but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2,6-dimethoxyphenol; 2,3,6-trimethylphenol; 2,3,5,6-tetramethylphenol; and 2,6-diethoxyphenol.

Some of the homopolymers which can be produced and which are within the above formula are:
poly(2,6-dilauryl-1,4-phenylene)ether;
poly(2,6-diphenyl-1,4-phenylene)ether; poly(2,6-dimethoxy-1,4-phenylene)ether;
poly(2,6-diethoxy-1,4-phenylene)ether;
poly(2,6-methoxy-6-ethoxy-1,4-phenylene)ether; poly(2-ethyl-6-stearyloxy-1,4-phenylene)ether;
poly(2,6-dichloro-1,4-phenylene)ether; poly(2,6-methyl-6-phenyl-1,4-phenylene)ether;
poly(2,6-dibenzyl-1,4-phenylene)ether;
poly(2,6-ethoxy-1,4-phenylene)ether;
poly(2-chloro-1,4-phenylene)ether; and poly(2,6-dibromo-1,4-phenylene)ether.

Some of the copolymers which can be produced and which are within the above formula include, but are not limited to:
poly(2,6-dimethyl-co-2,3,6-trimethyl-1,4-phenylene)ether and poly(2,6-dimethyl-co-2-methyl-6-butyl-1,4-phenylene)ether.
These are prepared from the corresponding monomers, for instance, from a mixture of 2,6-dimethylphenol and 2,3,6-trimethylphenol, or a mixture of 2,6-dimethylphenol and 2-methyl-6-butylphenol, respectively.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms, with special mention being made of poly(2,6-dimethyl-1,4-phenylene)ether.

Suitable polysiloxanes for this invention are diorganopolysiloxanes having the formula

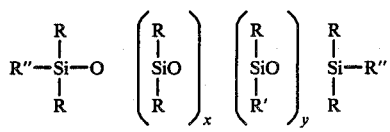

in which R is independently a monovalent hydrocarbon free of unsaturation; R' is a hydrocarbon having alkenyl unsaturation; R" may be the same as R, or R', or hydroxy; and x and y are positive integers sufficient to provide up to about 0.2 to 2.0 mole percent of R' comprising units.

Preferably, this polymer will be a high molecular weight material, having a weight average molecular weight from about 20,000 to about 600,000 or more.

Most preferred are trimethylsiloxy chain-stopped dimethylpolysiloxanes containing vinyl substituents, such as those represented by the formula

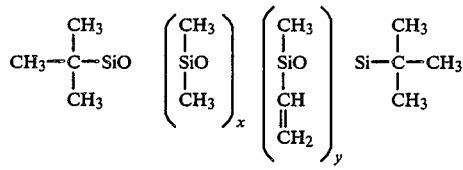

in which x and y are as defined above.

The composition can also contain organopolysiloxane resins suitable as co-additives which are soluble in up to one-half of the polydiorganosiloxanes. These are preferably comprised of chemically combined siloxy units selected from the following group:

$R_3SiO_{0.5}$
$RR'SiO$
$R_2SiO$
$R'_2SiO$
$R'SiO_{1.5}$
$RSiO_{1.5}$
$R'R_2SiO_{0.5}$ and
$SiO_2$ including mixtures thereof, in which each R represents a saturated or unsaturated monovalent hydrocarbon radical, and each R' represents a group such as R or a group selected from among hydrogen, alkoxy, aryl, allyl and vinyl.

Compounding can be carried out in any convenient manner, for example, by milling or extrusion at elevated temperatures.

Suitable polyarylolefin-polyolefins for purposes of this invention are block copolymer of a vinyl aromatic compound and an alkylene or alkylenes, for instance, a block copolymer of styrene and butadiene in which the degree of aliphatic unsaturation has been reduced to yield a styrene-ethylene/butylene-styrene block copolymer. These can be used alone or in conjunction with other polyolefins such as polyethylene, copolymers of polyethylene with hexene or butene, and so forth.

Besides styrene, the alkenyl aromatic compound can be an analog or homolog thereof and, in general, will be a compound of the formula

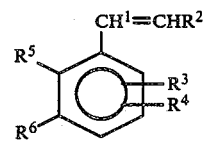

in which $R^1$ and $R^2$ are selected from the group consisting of lower alkyl or alkenyl groups having from 1 to 6 carbon atoms, and hydrogen; $R^3$ and $R^4$ are selected from the group consisting of chloro, bromo, hydrogen and lower alkyl having from 1 to 6 carbon atoms; $R^5$ and $R_6$ are selected from the group consisting of hydrogen and lower alkyl or alkenyl groups having from 1 to 6 carbon atoms, or $R^5$ and $R^6$, may be concatenated together with hydrocarbyl groups to form a naphthyl group.

In addition to styrene, examples are alpha-methylstyrene, para-methylstyrene, 2,4-dimethyl-styrene, chlorostyrene, bromostyrene, p-tert-butylstyrene, p-ethylstyrene, vinyl xylene, divinyl benzene and vinyl naphthalene. Styrene is the most preferred.

Preferably, but not necessarily, component (b) of the compositions will comprise a major amount of polyarylolefin-polyolefin and a minor amount of the diorganopolysiloxane, the balance comprising a small amount of the linking agent. In especially preferred embodiments, component (b) comprises from about 50 to about 95 parts by weight of the polyarylolefin-polyolefin, e.g., SEBS, from about 50 to about 5 parts by weight of the organopolysiloxane, e.g., dimethylpolysiloxane, and from about 0.1 to about 1 part by weight of the linking agent, the sum of these amounts adding up to 100 parts.

With regard to the linking agent, component(b)(iii), in general this will comprise one or more organic peroxide compounds capable of generating free radicals at the elevated temperatures of pre-compounding. Examples include diaroyl peroxide such as dibenzoyl peroxide, bis-p-chlorobenzoyl peroxide, and bis-2,4-dichlorobenzoyl peroxide; dialkyl peroxides, such as di-t-butyl peroxide; diaralkyl peroxides, such as dicumyl peroxide; alkylaryl peroxides; alkyl aroyl and alkyl acyl peroxides, such as t-butyl perbenzoate, or t-butyl peracetate; and mixtures containing representatives of different types such as dibenzoyl peroxide and t-butyl perbenzoate. Other suitable examples are di(tert-butylperoxy)hexane, α,α'-bis(t-butylperoxy)diisopropyl benzene, ethyl-3,3-bis(t-butylperoxy)butyrate, n-butyl-4,4-bis(t-butylperoxy)valerate, and 2,5-dimethyl-2,5-di(t-butylperoxy)hexane-3.

The compositions of this invention can also be formulated to contain one or more supplementary ingredients to affect the chemical and/or physical properties, including flame retardant agents, drip retardant agents, stabilizers, antioxidants, fillers (e.g., fillers such as clay, silica, glass, etc.), colorants (e.g., pigments, dyes, etc.), impact strength enhancers, plasticizers, and so forth.

The flame retardant agent, if employed, is selected from among materials which contain chemical elements known to provide a flame retardancy function, such as bromine, chlorine, antimony, phosphorus and nitrogen. Illustratively, these may be various aliphatic and/or aromatic phosphates or phosphonates, chlorinated or brominated organic copounds, halogenated compounds in admixture with antimony compounds such as antimony oxide, halogen compounds in admixture with phosphorus compounds containing phosphorus-nitrogen bonds, and halogenated polymers such as chlorinated or brominated styrene homopolymers or copolymers and chlorinated or brominated aromatic polycarbonate oligomers.

Special mention is made of organic phosphate compounds of the formula

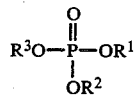

in which $R^1$, $R^2$ and $R^3$ are the same or different and are selected from the group consisting of alkyl, cycloalkyl, aryl, alkyl substituted aryl, halogen substituted aryl, aryl substituted alkyl, halogen or a combination of any of the foregoing, provided at least one R is always aryl.

Examples include phenyl bisdodecyl phosphate, phenylbisneopentyl phosphate, phenyl-bis(3,5,5'-tri-methyl-hexyl phosphate), ethyldiphenyl phosphate, 2-ethylhexyldi(p-tolyl)phosphate, bis-(2-ethylhexyl)phenyl phosphate, tri-(nonylphenyl)phosphate, di(dodecyl)p-tolyl phosphate, tricresyl phosphate, triphenyl phosphate, dibutylphenyl phosphate, 2-chloro-ethyldiphenyl phosphate, p-tolyl bis(2,5,5'-trimethyl-hexyl)phosphate, 2-ethylhexyldiphenyl phosphate, and the like.

Especially preferred for this invention is triphenyl phosphate, as such, or in the form of isopropylated triphenyl phosphate, these compounds serving as both a flame retardant agent and plasticizer in the appropriate, conventional amounts.

Also noteworthy as flame retardant additives for this invention are difunctional and polyfunctional organic phosphate compounds and polymers such as described in British Pat. No. 2,043,083, the disclosure of which is incorporated herein by reference. These are represented by the following formulae:

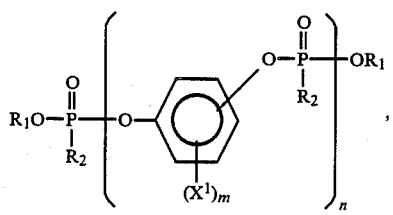

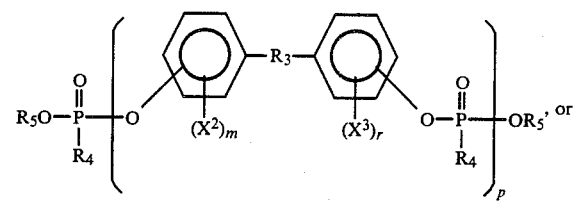

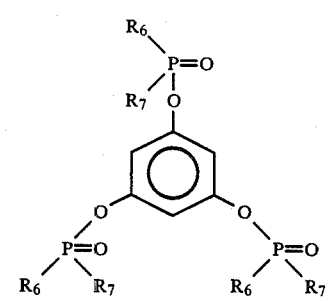

in which $R_1$, $R_3$ and $R_5$ are independently hydrocarbon; $R_2$, $R_4$, $R_6$ and $R_{71}$ are independently hydrocarbon or hydrocarbonoxy; X, $X^2$ and $X^3$ are halogen; m and r are zero or integers from 1 to 4; and n and p represent the total number of units and are integers from 1 to about 30.

Examples include the bis diphenyl phosphates of resorcinol, hydroquinone and bisphenol-A.

The flame retardant agent can also be a bis-phenoxy alkane of the formula wherein R' is alkylene, straight or branched, having from 1 to 10 carbon atoms, more preferably from 1 to about 6 carbon atoms; and q and s represent the total number of bromine atoms on each ring and are independently integers from 1 to 5. Examples are: 1,2-bis(2,4,6-tribromophenoxy)ethane; 1,3-bis(2,4,6-tribromophenoxy)propane; 1,4-bis(2,4,6-tribromophenoxy)butane; and 2,2-bis(4-bromophenoxy)propane. Preferred are 1,2-bis(2,4,6-tribromophenoxy)ethane and 1,2-bis(2,3,4,5,6-pentabromophenoxy)ethane. A method of preparation is described in U.S. Pat. No. 4,016,138 (Anderson).

Additionally useful flame retardant agents comprise chlorinated and/or brominated aromatic polycarbonate oligomers, for example. tetrabromobisphenol-A.

The invention is further illustrated in the examples which follow.

EXAMPLE 1

The following composition was prepared by milling the ingredients on a roll mill at a temperature of 250°–260° F., remilling for 3 minutes at a temperature of 360° F., adding 0.5 percent by weight of a conventional antioxidant to the milled composition, cooling, cutting into small pieces and molding into test bars at a temperature of 446° F. (100° F. mold temperature).

| Ingredients | Amount, Parts by Weight |
| --- | --- |
| Polyethylene homopolymer (mol. wt. about 8,000) | 10 |
| Linear low density polyethylene (LLDPE) | 10 |
| Dimethylpolysiloxane gum, containing about 0.2% vinyl units | 30 |
| Styrene-ethylene/butylene styrene block copolymer (SEBS) | 50 |
| Fumed silica | 15 |
| Dibasic lead phthalate | 10 |
| α,α'-bis(tert-butylperoxy)-diisopropyl benzene | 0.5 |
| Octadecyl 3,5-di-tert.butyl-4-hydroxy hydrocinnamate | 0.5 |

The composition prepared as described above was used to make a composition in accordance with this invention by tumble mixing 20 parts by weight with 80 parts by weight of poly(2,6-dimethyl-1,4-phenylene)ether (PPO ®, General Electric Co.) and 20 parts by weight of isopropylated triphenyl phosphate (Kronitex 50, FMC Corp.), extruding at about 550° F. and molding into test pieces at about 500° F.

For comparison purposes, a corresponding composition comprised of 80 parts of PPO and 20 parts of K-50, but without the pre-compounded components, was also prepared and molded. The results are reported in Table 1.

TABLE 1

|  | Example 1 | Comparison 1A |
| --- | --- | --- |
| Ingredients, pbw | | |
| Poly(2,6-dimethyl-1,4-phenylene)ether | 80 | 80 |
| Isopropylated triphenyl phosphate | 20 | 20 |
| Precompound | 20 | — |
| Properties | | |
| Notched Izod impact strength, ft. lb./in. n. | 5.65 | 0.33 |
| Horizontal Burn Test, ⅛ inch test sample | NP, NP | NP, NP |
| Vertical Burn Test, ⅛ inch test sample | ND, ND | ND, ND |
| 1st. ignition | 1, 1 | 1, 1 |
| 2nd. ignition | 4, 6 | 2, 1 |

ND = No Drip
NP = No Propagation

EXAMPLE 2

Using the same procedure described in Example 1, another composition in accordance with the present invention was prepared with 4 parts by weight of the precompounded composition of the previous example, 63.5 parts by weight of poly(2,6-dimethyl-1,4-phenylene)ether resin, 14.0 parts by weight of isopropylated triphenyl phosphate, 17.5 parts by weight of clay, 1.0 parts by weight of polyethylene and 0.3 part by weight of antioxidant/stabilizer.

Again, a comparison composition was prepared, containing the same ingredients in the same amounts but without the precompound. The results are given in Table 2.

TABLE 2

|  | Comparison 2A | Example 2 |
| --- | --- | --- |
| Ingredients, pbw | | |
| Poly(2,6-dimethyl-1,4-phenylene)ether | 63.5 | 63.5 |
| Isopropylated triphenyl phosphate | 14.0 | 14.0 |
| Precompound (See Ex. 1) | — | 4.0 |
| Clay | 17.5 | 17.5 |
| Polyethylene homopolymer | 1.0 | 1.0 |
| Stabilizer/Antioxidant | 0.30 | 0.30 |
| Properties | | |
| Channel flow length, in inches at 580° F. | 17.5 | 19.0 |
| Melt viscosity, poise at 580° F. | 1560 | 1560 |
| Tensile strength, psi | 12,400 | 11,100 |
| Elongation, % | 47 | 45 |
| Notched Izod impact strength, ft. lb./in. n. | 1.0 | 1.3 |
| Unnotched Izod impact strength, ft. lb. | 14 | 17 |
| Flexural strength, psi × $10^{-3}$ | 665 | 602 |
| Heat distortion temp., °F., ⅛ inch sample | 247.5 | 239 |
| UL-94 Burn Test: | | |
| ⅛ inch sample | VO (2.1) | VO (4.3) |
| 1/16 inch sample | VO (1.2) | VO (2.5) |

As can be seen, the Izod impact strengths of Composition 2, in accordance with the invention, are better than those of Composition 2A, the comparison blend.

Other modifications and variations of the invention are possible in the light of the above disclosure. It should be understood, therefore, that changes may be made in the particular embodiments shown which are still within the scope of the invention defined in the appended claims.

What is claimed is:

1. A thermoplastic composition comprising an admixture of:
   (a) a polyphenylene ether resin; and
   (b) a precompounded thermoplastic composition of a poly(arylolefin-olefin), an organopolysiloxane and an effective amount of a linking agent.

2. A composition according to claim 1, in which the polyphenylene ether, component (a), is a homopolymer or copolymer having units of the formula

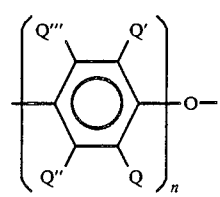

in which Q, Q', Q" and Q'" are independently selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20.

3. A composition according to claim 2, in which component (a) is poly(2,6-dimethyl-1,4-phenylene)ether.

4. A composition according to claim 1, in which component (b) comprises a major amount of the poly(arylolefin-olefin) and a minor amount of the organopolysiloxane.

5. A composition according to claim 4, in which component (b) comprises from about 50 to about 90 parts by weight of the poly(arylolefin-olefin), from about 10 to about 50 parts by weight of the organopolysiloxane, and the balance being made up of the linking agent, based on 100 parts by weight of (b).

6. A composition according to claim 1, in which the organopolysiloxane of component (b) comprises a diorganopolysiloxane.

7. A composition according to claim 6, in which the diorganopolysiloxane is a high molecular weight material having the formula

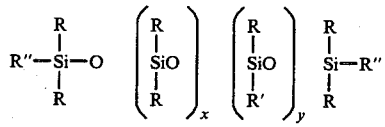

in which R is independently a monovalent hydrocarbon free of unsaturation; R' is a hydrocarbon having alkenyl unsaturation; R" may be the same as R, or R''', or hydroxy; and x and y are positive integers sufficient to provide up to about 0.2 to 2.0 mole percent of R' comprising units.

8. A composition according to claim 7, in which the diorganopolysiloxane has a weight average molecular weight from about 20,000 to about 600,000 or more.

9. A composition according to claim 6, in which the diorganopolysiloxane is a vinyl-containing dimethylpolysiloxane having the formula

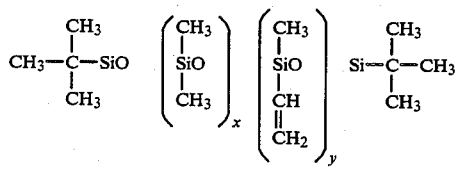

10. A composition according to claim 6, in which also includes as a co-additive with the diorganopolysiloxane an organopolysiloxane comprised of chemically combined siloxy units selected from the group consisting of:
$R_3SiO_{0.5}$
RR'SiO
$R_2SiO$
$R'_2SiO$
$R'SiO_{1.5}$
$RSiO_{1.5}$
$R'R_2SiO_{0.5}$ and
$SiO_2$
including mixtures of any of the foregoing, in which each R represents a saturated or unsaturated monovalent hydrocarbon radical, and each R' represents a group such as R or a group selected from among hydrogen, hydroxy, alkoxy, aryl, allyl and vinyl.

11. A composition according to claim 1, in which the poly(arylolefin-olefin) of component (b) is a styrene-ethylene/butylene-styrene block copolymer.

12. A composition according to claim 1, in which the linking agent is an organic peroxide compound.

13. A composition according to claim 12, in which the organic peroxide is α,α'-bis(t-butylperoxy)diisopropyl benzene.

14. A composition according to claim 1, in which the composition contains a filler.

15. A composition according to claim 14, in which the filler is glass.

16. A composition according to claim 15, in which the mineral filler is selected from silicas and clays.

17. A composition according to claim 16, in which the mineral filler is a fumed silica.

18. A composition according to claim 1, which also contains one or more additives selected from among antioxidants, stabilizers, flame retardant agents, drip retardant agents, plasticizers, colorants and impact strength enhancers.

19. A composition according to claim 1, which contains a drip retardant-char producing agent comprising a metal organic salt.

20. A composition according to claim 19, in which the metal organic salt is dibasic lead phthalate.

21. A composition according to claim 1, which contains a flame retardant agent.

22. A composition according to claim 21, in which the flame retardant agent is an organic phosphate.

23. A composition according to claim 22, in which the organic phosphate is an aromatic monofunctional phosphate, a difunctional phosphate or a polyfunctional phosphate.

24. A composition according to claim 23, in which the flame retardant is selected from among triphenyl phosphate and isopropylated triphenyl phosphate.

25. A composition according to claim 23, in which the flame retardant agent is selected from among the bis diphenyl phosphates of resorcinol, hydroquinone and bisphenol-A.

26. A composition according to claim 21, in which the flame retardant agent is a bis-phenoxy alkane.

27. A composition according to claim 26, in which the bis-phenoxy alkane is bromine substituted.

* * * * *

UNITED STATES PATENT AND TRADEMARK OFFICE
CERTIFICATE OF CORRECTION

PATENT NO. : 4,535,106
DATED : August 13, 1985
INVENTOR(S) : Visvaldis Abolins and Fred F. Holub It is certified that error appears in the above—identified patent and that said Letters Patent is hereby corrected as shown below:

In column 3, from about line 21 to about line 27, the formula should be as follows:

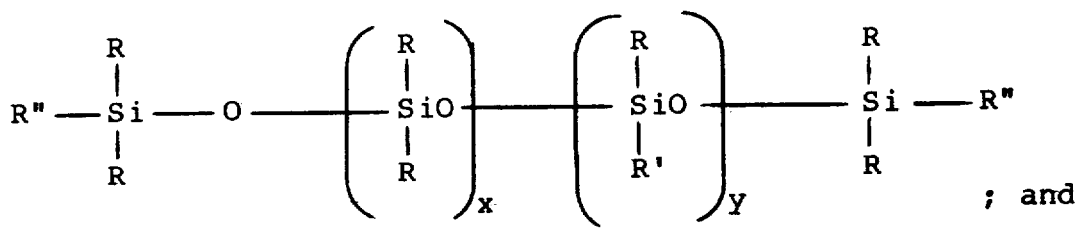

; and from about line 40 to about line 47, the formula should be as follows:

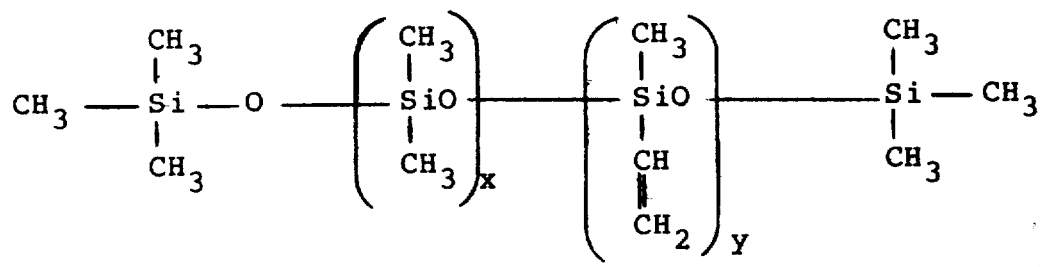

In column 9, from about line 12 to about line 18, the formula should be as follows:

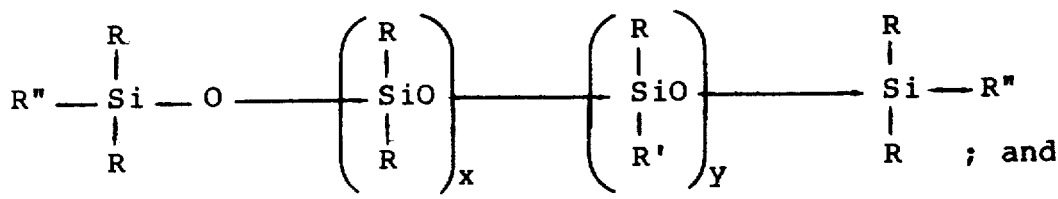

; and

UNITED STATES PATENT AND TRADEMARK OFFICE
CERTIFICATE OF CORRECTION

PATENT NO. : 4,535,106
DATED : August 13, 1985
INVENTOR(S) : Visvaldis Abolins and Fred F. Holub It is certified that error appears in the above—identified patent and that said Letters Patent is hereby corrected as shown below:

from about line 32 to about line 40, the formula should be as follows:

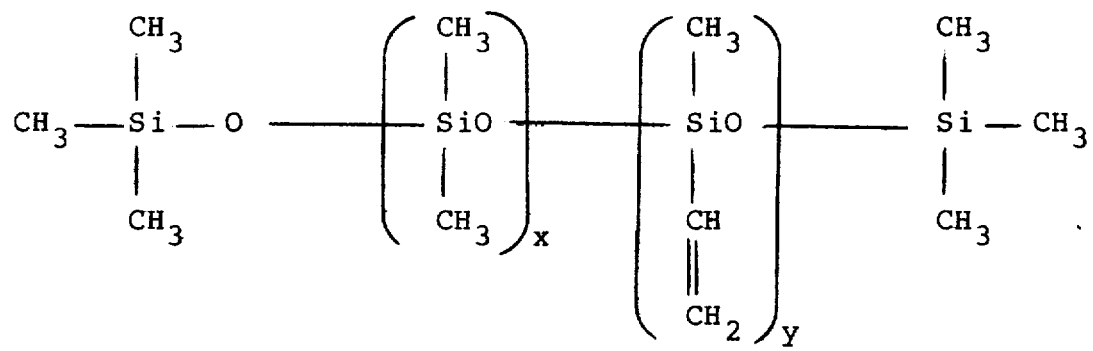

Signed and Sealed this

Twenty-fourth Day of June 1986

[SEAL]

Attest:

DONALD J. QUIGG

Attesting Officer

Commissioner of Patents and Trademarks